United States Patent
Wu (10) Patent No.: US 12,372,724 B2
(45) Date of Patent: Jul. 29, 2025

(54) LIGHT SPLITTING DEVICE

(71) Applicant: Apple Inc., Cupertino, CA (US)

(72) Inventor: Yi-Kuei Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 114 days.

(21) Appl. No.: 17/408,122

(22) Filed: Aug. 20, 2021

(65) Prior Publication Data

US 2022/0091333 A1    Mar. 24, 2022

Related U.S. Application Data

(60) Provisional application No. 63/082,461, filed on Sep. 23, 2020.

(51) Int. Cl.
*G02B 6/28* (2006.01)
*G02B 6/122* (2006.01)
(Continued)

(52) U.S. Cl.
CPC ............ *G02B 6/28* (2013.01); *G02B 6/1228* (2013.01); *G02B 6/125* (2013.01); *G02B 6/14* (2013.01); *G02B 2006/1215* (2013.01)

(58) Field of Classification Search
CPC ............ A61B 50/33; A61B 2050/3008; A61B 2050/314; A61B 2090/033; A61L 2/07;
(Continued)

(56) References Cited

U.S. PATENT DOCUMENTS 3,920,314 A * 11/1975 Yajima .................. G02F 1/3137
385/9
4,934,775 A    6/1990 Koai
(Continued)

FOREIGN PATENT DOCUMENTS

CN        201177670 Y  *  1/2009
CN        104614084       5/2015
(Continued)

OTHER PUBLICATIONS

Y. Wang et al. Ultra-broadband and low-loss 3 dB optical power splitter based on adiabatic tapered silicon waveguides. Optics Letters, 41:9:2053-2057, May 1, 2016 (https://doi.org/10.1364/OL.41.002053) (Year: 2016).*
(Continued)

*Primary Examiner* — Michael Stahl
(74) *Attorney, Agent, or Firm* — Brownstein Hyatt Farber Schreck, LLP (57) ABSTRACT

Configurations for a one by four light splitting device are disclosed. The light splitting device may include a primary waveguide, a first coupling waveguide, and a second coupling waveguide. The primary waveguide may couple light from the primary waveguide into both the first and second coupling waveguides. Due to the manipulation of the coupling modes, a fundamental mode of light may be input and four fundamental modes of light may be output. In some examples, the primary waveguide may input a fundamental mode of light that may be converted into a first hybrid mode, which may be a four lobe mode. The first and second coupling waveguides may be tapered and separated by a gap such that the first hybrid mode may be converted into two second hybrid modes, which may then be converted back into four fundamental modes of output light.

20 Claims, 7 Drawing Sheets

(51) Int. Cl.
*G02B 6/125* (2006.01)
*G02B 6/14* (2006.01)
*G02B 6/12* (2006.01)

(58) Field of Classification Search
CPC .................. A61L 2/26; A61L 2202/24; G02B 2006/1215; G02B 6/28; G02B 6/2804; G02B 6/2808; G02B 6/2813; G02B 6/2852
USPC .............................. 385/27–32, 39, 41–46, 50
See application file for complete search history.

(56) References Cited

U.S. PATENT DOCUMENTS

| | | | |
|---|---|---|---|
| 5,044,715 A | 9/1991 | Kawachi | |
| 5,287,376 A | 2/1994 | Paoli | |
| 5,379,354 A * | 1/1995 | Jenkins | H01P 1/16 385/27 |
| 5,488,678 A | 1/1996 | Taneya | |
| 5,524,156 A | 6/1996 | Van Der Tol | |
| 5,544,268 A | 8/1996 | Bischel | |
| 5,586,206 A | 12/1996 | Brinkman | |
| 5,617,439 A | 4/1997 | Kakimoto | |
| 5,644,667 A | 7/1997 | Tabuchi | |
| 5,647,036 A | 7/1997 | Deacon | |
| 5,652,817 A | 7/1997 | Brinkman | |
| 5,664,032 A | 9/1997 | Bischel | |
| 5,708,674 A | 1/1998 | Berrnink | |
| 5,718,989 A | 2/1998 | Aoki | |
| 5,724,463 A | 3/1998 | Deacon | |
| 5,742,631 A | 4/1998 | Paoli | |
| 5,790,720 A | 8/1998 | Marcuse | |
| 5,799,199 A | 8/1998 | Ito et al. | |
| 5,818,989 A * | 10/1998 | Nakamura | G02B 6/125 385/39 |
| 5,835,458 A | 11/1998 | Bischel | |
| 5,848,088 A | 12/1998 | Mori et al. | |
| 5,850,411 A | 12/1998 | Major, Jr. | |
| 5,911,018 A | 6/1999 | Bischel | |
| 5,912,997 A | 6/1999 | Bischel | |
| 5,915,165 A | 6/1999 | Sun | |
| 5,923,801 A * | 7/1999 | Frank | G02B 6/125 385/50 |
| 5,940,556 A | 8/1999 | Moslehi et al. | |
| 5,978,524 A | 11/1999 | Bischel | |
| 6,014,390 A | 1/2000 | Joyner | |
| 6,078,704 A | 6/2000 | Bischel | |
| 6,118,908 A | 9/2000 | Bischel | |
| 6,122,042 A | 9/2000 | Wunderman et al. | |
| 6,141,465 A | 10/2000 | Bischel | |
| 6,167,169 A | 12/2000 | Brinkman | |
| 6,330,378 B1 | 12/2001 | Forrest | |
| 6,345,133 B1 | 2/2002 | Morozov | |
| 6,393,185 B1 | 5/2002 | Deacon | |
| 6,415,080 B1 | 7/2002 | Sappey et al. | |
| 6,522,794 B1 | 2/2003 | Bischel | |
| 6,556,688 B1 | 4/2003 | Ratnakar | |
| 6,584,136 B2 | 6/2003 | Ju et al. | |
| 6,594,409 B2 | 7/2003 | Dutt et al. | |
| 6,628,686 B1 | 9/2003 | Sargent | |
| 6,643,432 B2 | 11/2003 | Bouda | |
| 6,657,723 B2 | 12/2003 | Cohen | |
| 6,674,949 B2 | 1/2004 | Allan et al. | |
| 6,795,622 B2 | 9/2004 | Forrest | |
| 6,803,604 B2 | 10/2004 | Takahashi et al. | |
| 6,842,545 B2 | 1/2005 | Lackritz et al. | |
| 6,882,758 B2 | 4/2005 | Betty | |
| 6,892,449 B1 | 5/2005 | Brophy et al. | |
| 6,903,820 B2 | 6/2005 | Wang | |
| 6,934,447 B2 | 8/2005 | Kim | |
| 6,940,182 B2 | 9/2005 | Hilton et al. | |
| 6,947,639 B2 | 9/2005 | Singh | |
| 6,952,504 B2 | 10/2005 | Bi | |
| 6,954,568 B2 * | 10/2005 | Liu | G02B 6/125 385/14 |
| 6,987,906 B2 | 1/2006 | Nakama et al. | |
| 7,016,568 B2 | 3/2006 | Van Weerden et al. | |
| 7,031,568 B2 | 4/2006 | Laming et al. | |
| 7,054,517 B2 | 5/2006 | Mossberg | |
| 7,058,245 B2 | 6/2006 | Farahi | |
| 7,079,715 B2 | 7/2006 | Kish | |
| 7,103,247 B2 | 9/2006 | Yamazaki et al. | |
| 7,149,387 B2 | 12/2006 | Balakrishnan et al. | |
| 7,151,635 B2 | 12/2006 | Bidnyk et al. | |
| 7,189,011 B2 | 3/2007 | Harker | |
| 7,203,401 B2 | 4/2007 | Mossberg | |
| 7,203,426 B2 | 4/2007 | Wu et al. | |
| 7,209,611 B2 | 4/2007 | Joyner | |
| 7,245,379 B2 | 7/2007 | Schwabe | |
| 7,263,394 B2 | 8/2007 | Wang | |
| 7,269,356 B2 | 9/2007 | Winzer | |
| 7,283,694 B2 | 10/2007 | Welch | |
| 7,314,451 B2 | 1/2008 | Halperin et al. | |
| 7,324,195 B2 | 1/2008 | Packirisamy et al. | |
| 7,327,918 B2 | 2/2008 | Yamazaki et al. | |
| 7,366,364 B2 | 4/2008 | Singh | |
| 7,366,421 B2 | 4/2008 | Cho et al. | |
| 7,421,167 B2 | 9/2008 | Charters et al. | |
| 7,444,048 B2 | 10/2008 | Peters et al. | |
| 7,447,393 B2 | 11/2008 | Yan | |
| 7,460,742 B2 | 12/2008 | Joyner | |
| 7,477,384 B2 | 1/2009 | Schwabe | |
| 7,483,599 B2 | 1/2009 | Dominic et al. | |
| 7,526,007 B2 | 4/2009 | Chua et al. | |
| 7,558,301 B2 | 7/2009 | Lin et al. | |
| 7,595,879 B2 | 9/2009 | Wang | |
| 7,680,364 B2 | 3/2010 | Nilsson | |
| 7,689,075 B2 | 3/2010 | Jenkins et al. | |
| 7,720,328 B2 | 5/2010 | Yan | |
| 7,831,298 B1 | 11/2010 | Wang | |
| 7,840,108 B2 | 11/2010 | Miyadera et al. | |
| 7,876,983 B2 | 1/2011 | Doerr | |
| 7,885,302 B2 | 2/2011 | Eberhard | |
| 7,885,492 B2 | 2/2011 | Welch | |
| 7,970,458 B2 | 6/2011 | Norris et al. | |
| 7,974,504 B2 | 7/2011 | Nagarajan et al. | |
| 7,999,938 B2 | 8/2011 | Wang | |
| 8,300,994 B2 | 10/2012 | Welch et al. | |
| 8,411,260 B1 | 4/2013 | Feng | |
| 8,463,345 B2 | 6/2013 | Kuhn et al. | |
| 8,498,681 B2 | 7/2013 | Wang et al. | |
| 8,515,217 B2 | 8/2013 | Bernasconi et al. | |
| 8,559,775 B2 | 10/2013 | Babie et al. | |
| 8,564,784 B2 | 10/2013 | Wang et al. | |
| 8,724,100 B1 | 5/2014 | Asghari et al. | |
| 8,920,332 B2 | 12/2014 | Hong et al. | |
| 8,964,796 B2 | 2/2015 | Wunderer et al. | |
| 8,983,250 B2 | 3/2015 | Black et al. | |
| 9,020,004 B2 | 4/2015 | Jeong | |
| 9,028,123 B2 | 5/2015 | Nichol et al. | |
| 9,031,412 B2 | 5/2015 | Nagarajan | |
| 9,052,447 B2 | 6/2015 | Luo et al. | |
| 9,110,259 B1 | 8/2015 | Black | |
| 9,112,330 B2 | 8/2015 | Gronenborn et al. | |
| 9,135,397 B2 | 9/2015 | Denyer et al. | |
| 9,176,282 B2 | 11/2015 | Pottier | |
| 9,217,669 B2 | 12/2015 | Wu et al. | |
| 9,348,154 B2 | 5/2016 | Hayakawa | |
| 9,369,201 B2 | 6/2016 | Luo et al. | |
| 9,370,689 B2 | 6/2016 | Guillama et al. | |
| 9,395,494 B2 | 7/2016 | Krishnamurthi et al. | |
| 9,405,066 B2 | 8/2016 | Mahgerefteh | |
| 9,543,736 B1 | 1/2017 | Barwicz et al. | |
| 9,557,482 B2 | 1/2017 | Oka et al. | |
| 9,588,295 B2 | 3/2017 | Onawa | |
| 9,620,931 B2 | 4/2017 | Tanaka | |
| 9,643,181 B1 | 5/2017 | Chang | |
| 9,678,012 B2 | 6/2017 | Rothberg et al. | |
| 9,759,865 B1 | 9/2017 | Lin | |
| 9,766,370 B2 | 9/2017 | Aloe et al. | |
| 9,784,679 B2 | 10/2017 | Rothberg et al. | |
| 9,804,027 B2 | 10/2017 | Fish et al. | |
| 9,817,296 B2 | 11/2017 | Sharkawy et al. | |
| 9,829,631 B2 | 11/2017 | Lambert | |

(56) References Cited

U.S. PATENT DOCUMENTS

| | | | |
|---|---|---|---|
| 9,869,816 B2 | 1/2018 | Ishikura et al. | |
| 9,875,560 B2 | 1/2018 | Rajagopalan | |
| 9,880,352 B2 | 1/2018 | Florjanczyk et al. | |
| 9,943,237 B2 | 4/2018 | Baker et al. | |
| 9,946,020 B1* | 4/2018 | Horth | G02B 6/124 |
| 9,948,063 B2 | 4/2018 | Caneau et al. | |
| 9,977,187 B2 | 5/2018 | Shi et al. | |
| 10,009,668 B2 | 6/2018 | Liboiron-Ladouceur | |
| 10,016,613 B2 | 7/2018 | Kavounas et al. | |
| 10,126,498 B1 | 11/2018 | Marcuse | |
| 10,132,996 B2 | 11/2018 | Lambert | |
| 10,136,859 B2 | 11/2018 | Cutaia | |
| 10,203,454 B2 | 2/2019 | Liu | |
| 10,215,689 B2 | 2/2019 | Wang et al. | |
| 10,238,351 B2 | 3/2019 | Halperin et al. | |
| 10,243,684 B2 | 3/2019 | Wen | |
| 10,285,898 B2 | 5/2019 | Douglas et al. | |
| 10,290,994 B2 | 5/2019 | Uchida et al. | |
| 10,310,196 B2 | 6/2019 | Hutchison | |
| 10,359,571 B2 | 7/2019 | Horth | |
| 10,429,597 B2 | 10/2019 | ten Have et al. | |
| 10,495,813 B2 | 12/2019 | Mahgerefteh et al. | |
| 10,520,672 B2 | 12/2019 | Ma et al. | |
| 10,529,003 B2 | 1/2020 | Mazed | |
| 10,551,567 B2 | 2/2020 | Wang et al. | |
| 10,578,806 B2 | 3/2020 | Lamponi et al. | |
| 10,687,718 B2 | 6/2020 | Allec et al. | |
| 10,852,492 B1 | 12/2020 | Vermeulen et al. | |
| 10,901,148 B2 | 1/2021 | Ma et al. | |
| 10,935,726 B1 | 3/2021 | Lee et al. | |
| 10,976,489 B2 | 4/2021 | Jou et al. | |
| 10,983,200 B1 | 4/2021 | Shen et al. | |
| 10,996,399 B2* | 5/2021 | Yang | H04B 10/2581 |
| 11,022,522 B2 | 6/2021 | Piazza et al. | |
| 11,064,592 B1 | 7/2021 | Bismuto et al. | |
| 11,079,542 B2 | 8/2021 | Fertig et al. | |
| 11,079,547 B2 | 8/2021 | Trita | |
| 11,131,809 B2 | 9/2021 | Villafranca Velasco | |
| 11,231,319 B1 | 1/2022 | Tu et al. | |
| 11,280,960 B2 | 3/2022 | Qi et al. | |
| 11,320,720 B2 | 5/2022 | Puckett et al. | |
| 11,402,581 B2 | 8/2022 | Baba | |
| 11,480,731 B2 | 10/2022 | Liu et al. | |
| 11,500,154 B1* | 11/2022 | Wu | G02B 27/10 |
| 11,506,535 B1 | 11/2022 | Tu et al. | |
| 11,561,346 B2 | 1/2023 | Tu et al. | |
| 11,630,262 B2 | 4/2023 | Shin et al. | |
| 11,644,619 B2 | 5/2023 | Qi et al. | |
| 11,906,778 B2 | 2/2024 | Arbore et al. | |
| 11,971,574 B2 | 4/2024 | Wu et al. | |
| 2003/0091265 A1 | 5/2003 | Lin et al. | |
| 2003/0133663 A1 | 7/2003 | Orignac et al. | |
| 2004/0126117 A1 | 7/2004 | Lo et al. | |
| 2005/0031267 A1* | 2/2005 | Sumimoto | G02B 6/2804 385/45 |
| 2005/0053112 A1 | 3/2005 | Shams-Zadeh-Amiri | |
| 2005/0063431 A1 | 3/2005 | Gallup et al. | |
| 2006/0002443 A1 | 1/2006 | Farber et al. | |
| 2006/0002653 A1 | 1/2006 | Grunnet-Jepsen et al. | |
| 2006/0039646 A1* | 2/2006 | Nashimoto | G02F 1/3137 385/39 |
| 2007/0217739 A1 | 9/2007 | McGreer et al. | |
| 2008/0044128 A1 | 2/2008 | Kish et al. | |
| 2008/0138008 A1 | 6/2008 | Tolstikhin et al. | |
| 2008/0266639 A1 | 10/2008 | Melloni et al. | |
| 2008/0310470 A1 | 12/2008 | Ooi et al. | |
| 2010/0158067 A1 | 6/2010 | Nakatsuka et al. | |
| 2012/0002924 A1 | 1/2012 | Okayama | |
| 2013/0156361 A1 | 6/2013 | Kojima et al. | |
| 2014/0029943 A1 | 1/2014 | Mathai et al. | |
| 2014/0270620 A1 | 9/2014 | Anderson et al. | |
| 2015/0036964 A1* | 2/2015 | Okano | G02B 6/125 385/14 |
| 2015/0104130 A1 | 4/2015 | Anderson et al. | |
| 2015/0338577 A1 | 11/2015 | Shi et al. | |
| 2016/0224750 A1 | 8/2016 | Kethman et al. | |
| 2017/0164878 A1 | 6/2017 | Connor | |
| 2018/0241174 A1 | 8/2018 | Weber | |
| 2019/0052063 A1 | 2/2019 | Tolstikhin | |
| 2019/0339468 A1 | 11/2019 | Evans | |
| 2019/0342009 A1 | 11/2019 | Evans | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0297955 A1 | 9/2020 | Shouldice | |
| 2020/0309593 A1 | 10/2020 | Bismuto et al. | |
| 2020/0333530 A1 | 10/2020 | Lin et al. | |
| 2021/0033805 A1 | 2/2021 | Bishop et al. | |
| 2021/0191039 A1 | 6/2021 | Jou et al. | |
| 2021/0199576 A1 | 7/2021 | Arbore et al. | |
| 2021/0270699 A1 | 9/2021 | Piazza et al. | |
| 2021/0391691 A1 | 12/2021 | Sugiyama et al. | |
| 2022/0011157 A1 | 1/2022 | Bismuto et al. | |
| 2022/0043207 A1 | 2/2022 | Bian | |
| 2022/0059992 A1 | 2/2022 | Hill et al. | |
| 2022/0099896 A1 | 3/2022 | Arbore et al. | |
| 2023/0071329 A1 | 3/2023 | Wu et al. | |
| 2023/0094833 A1 | 3/2023 | Wu | |
| 2023/0103057 A1* | 3/2023 | Wang | G02B 6/136 385/28 |
| 2023/0125733 A1 | 4/2023 | Thomas et al. | |
| 2023/0314210 A1 | 10/2023 | Bismuto et al. | |
| 2023/0358964 A1 | 11/2023 | Dezfouli et al. | |
| 2024/0077679 A1 | 3/2024 | Arbore et al. | |
| 2024/0077686 A1 | 3/2024 | Pelc et al. | |
| 2024/0103224 A1 | 3/2024 | Arbore et al. | |
| 2024/0156401 A1 | 5/2024 | Harris et al. | |

FOREIGN PATENT DOCUMENTS

| | | |
|---|---|---|
| CN | 109445026 | 12/2020 |
| EP | 1403985 | 3/2004 |
| EP | 1432045 | 6/2004 |
| EP | 3561561 | 10/2019 |
| FR | 2949024 | 2/2011 |
| JP | S60127776 | 7/1985 |
| JP | S63177495 | 7/1988 |
| JP | H04204508 | 7/1992 |
| JP | H063709 | 1/1994 |
| JP | 2000077776 | 3/2000 |
| JP | 2001284702 | 10/2001 |
| JP | 2004246235 | 9/2004 |
| JP | 2005284256 | 10/2005 |
| JP | 2006284791 | 10/2006 |
| JP | 2007279240 | 10/2007 |
| JP | 2008262118 | 10/2008 |
| JP | 2010223991 | 10/2010 |
| JP | 2011232674 | 11/2011 |
| JP | 2015138870 | 7/2015 |
| JP | 2015152729 | 8/2015 |
| JP | 2015197664 | 11/2015 |
| JP | 2016148810 | 8/2016 |
| JP | 2016189437 | 11/2016 |
| JP | 2018004692 | 1/2018 |
| KR | 10-2003-0049636 | 6/2003 |
| WO | WO 01/014929 | 3/2001 |
| WO | WO 02/011339 | 2/2002 |
| WO | WO 04/031824 | 4/2004 |
| WO | WO 05/091036 | 9/2005 |
| WO | WO 05/022223 | 11/2007 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

X. Li et al. Compact and low-loss silicon power splitter based on inverse tapers. Optics Letters, 38:20:4220-4223, Oct. 15, 2013 (https://dx.doi.org/10.1364/OL.38.004220) (Year: 2013).*

(56) References Cited

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

U.S. Appl. No. 17/254,810, filed Dec. 21, 2020, Bishop et al.
U.S. Appl. No. 17/373,167, filed Jul. 12, 2021, Bismuto et al.
U.S. Appl. No. 17/379,759, filed Jul. 19, 2021, Lee et al.
U.S. Appl. No. 17/386,297, filed Jul. 27, 2021, Tu et al.
U.S. Appl. No. 17/386,362, filed Jul. 27, 2021, Tu et al.
U.S. Appl. No. 17/407,016, filed Aug. 19, 2021, Hill et al.

International Search Report and Written Opinion dated Dec. 6, 2021, PCT/US2021/047070, 10 pages.

He et al., "Integrated Polarization Compensator for WDM Waveguide Demultiplexers," IEEE Photonics Technology Letters vol. 11, No. 2, Feb. 1999, pp. 224-226.

Dai et al., "Compact silicon-on-insulator-based multimode interference coupler with bilevel taper structure," Applied Optics, Optical Society of America, vol. 44, No. 24, 2005, pp. 5036-5041.

Dai et al., "10-Channel Mode (de)multiplexer with Dual Polarizations," Laser & Photonics Reviews, vol. 12, No. 1, Nov. 17, 2017, 9 pages.

Krubhakar et al., "Design and fabrication of integrated optical 1x8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

Liu et al., "Silicon Multimode Waveguide Grating Filter at 2 μm," Journal of Lightwave Technology, IEEE USA, vol. 37, No. 10, May 15, 2019, pp. 2217-2222.

T. Murphy et al. "Wavelength and polarisation-intensive integrated directional couplers using Mach-Zehnder structures" (1999) Integrated Photonics Research, OSA Technical Digest Series (Optica Publishing Group).

Rasigade et al., "Compact wavelength-insensitive fabrication-tolerant silicon-on-insulator beam splitter," Optics Letters, Optical Society of America, vol. 35, No. 21, 2010, pp. 3700-3702.

* cited by examiner

LIGHT SPLITTING DEVICE

CROSS-REFERENCE TO RELATED APPLICATION

This application is a nonprovisional of and claims the benefit under 35 U.S.C. § 119(e) of U.S. Provisional Patent Application No. 63/082,461, filed Sep. 23, 2020, the contents of which are incorporated herein by reference as if fully disclosed herein.

FIELD

This disclosure relates generally to an optical system for splitting light. More particularly, embodiments herein relate to an optical system for splitting light by converting light modes using waveguides.

BACKGROUND

Generally, optical systems may employ multiple light sources for use in everyday devices such as computer mice, laser printers, and so forth. Although the systems may have multiple light outputs, there may be more light outputs than light sources as the light may be de-multiplexed or split. In some examples, the size of the optical system may increase to an unreasonable size as the optical systems tend to increase in scale with the number of cascading light splitting stages. Additionally, these large optical systems are not energy efficient and may introduce optical power loss into the optical system.

SUMMARY

Embodiments of the systems, devices, methods, and apparatuses described in the present disclosure are directed to an optical device for splitting light. Also described are systems, devices, methods, and apparatuses directed to splitting light using mode coupling between waveguides. In some examples, the optical device may function as a one by four splitter, insofar as light may be input on an input waveguide and light may be output on four waveguides. An input waveguide may provide light with a fundamental mode, where the input waveguide is positioned between a first coupling waveguide and a second coupling waveguide. The light may couple from the input waveguide to both the first and second coupling waveguides and the light may be converted from the fundamental mode of light to a first hybrid mode. The first and second coupling waveguides may be spaced apart from one another, and the light may convert from a first hybrid to a second hybrid mode. Each of the first and second coupling waveguides may have a Y-junction and the second hybrid mode may convert to the fundamental mode propagating on each of the four outputs of the two Y-junctions.

In some examples, the present disclosure describes a light splitting device. The light splitting device may include a first region configured to provide a fundamental mode of light, a second region configured to convert the fundamental mode of light to a first hybrid mode of light, the second region including: a primary waveguide with a first side and a second side, a first coupling waveguide adjacent to the first side of the primary waveguide, and a second coupling waveguide adjacent to the second side of the primary waveguide. The light spitting device may also include a third region configured to convert the first hybrid mode of light to multiple second hybrid modes of light, the third region including a first Y-junction in the first coupling waveguide and configured to convert one of the multiple second hybrid modes of light to the fundamental mode of light and a second Y-junction in the second coupling waveguide and configured to convert another of the multiple second hybrid modes of light to the fundamental mode of light. In some examples, the first hybrid mode of light is a four lobe mode of light, the multiple second hybrid modes of light are each two lobe modes of light, the primary waveguide terminates near an area that the fundamental mode of light is converted to the first hybrid mode of light. In some examples, the fundamental mode of light is inputted on the primary waveguide, and the Y-junctions are configured to output four converted fundamental modes.

In some examples, the first and second coupling waveguides are wider than the primary waveguide. In some examples, the first and second coupling waveguides in the second region are tapered waveguides, and optical coupling from the primary waveguide to the first and second coupling waveguides depends on at least a taper rate of the first and second coupling waveguides. In some examples, the first and second coupling waveguides in the second region decrease in width. In some examples, the first and second coupling waveguides in the third region are separated by a gap that increases in width. In some examples, in the second region, a width of a first gap between the primary waveguide and the first coupling waveguide and a width of a second gap between the primary waveguide and the second coupling waveguide is the same. In some examples, one of the multiple second hybrid modes of light is a first two lobe mode that propagates in the first coupling waveguide of the third region to the first Y-junction and another of the multiple second hybrid modes of light is a second two lobe mode that propagates in the second coupling waveguide of the third region to the second Y-junction.

In some examples, the present disclosure describes a light splitting device. The light splitting device may include an input region configured to provide light having a fundamental mode, an interactive region configured to convert the fundamental mode into a first hybrid mode, and a fanning region configured to convert the first hybrid mode into multiple second hybrid modes and convert the multiple second hybrid modes into multiple converted fundamental modes. In some examples, the first hybrid mode has four lobes, the multiple second hybrid modes each have two lobes, and the light splitting device may further include a silicon slab, a primary waveguide disposed on the silicon slab, a first coupling waveguide disposed on the silicon slab, a second coupling waveguide disposed on the silicon slab, the first and second coupling waveguides are rib waveguides in the interactive region, and the first and second coupling waveguides convert to strip waveguides in the fanning region. In some examples, the fanning region include a first coupling waveguide with a first Y-junction, a second coupling waveguide with a second Y-junction, and the first hybrid mode has four lobes to reduce optical loss near at least one or both of the first or second Y-junction.

In some examples, the light splitting device may also include a silicon slab, a first rib waveguide disposed on the silicon slab in the fanning region, a second rib waveguide disposed on the silicon slab in the fanning region, where the first rib waveguide and the second rib waveguide are separated from one another by a gap that increases in width along the fanning region and the gap comprises a low-index cladding region. In some examples, the light splitting device further includes a first rib waveguide that transitions to a first strip waveguide in the fanning region and a second rib waveguide that transitions to a second strip waveguide in the fanning region, thereby decoupling the first and second strip waveguides from one another. In some examples, the fanning region converts the multiple second hybrid modes into the fundamental mode, thereby outputting four fundamental modes with equal optical power. In some examples, the light splitting device further includes a first rib waveguide that transitions to a first strip waveguide in the fanning region, a second rib waveguide that transitions to a second strip waveguide in the fanning region, and the first rib waveguide completes transitioning to the first strip waveguide and the second rib waveguide completes transitioning to the second strip waveguide before the first hybrid mode converts to a second hybrid mode.

In some examples, the present disclosure describes a method for splitting light. The method may include inputting light having a fundamental mode of light using a primary waveguide in a first region, converting the fundamental mode of light into a first hybrid mode of light in a second region by coupling the fundamental mode of light from the primary waveguide to a first coupling waveguide and a second coupling waveguide, converting the first hybrid mode of light into multiple second hybrid modes of light in a third region, wherein the first coupling waveguide and the second coupling waveguide are separated by a gap, and converting the multiple second hybrid modes of light back into multiple fundamental modes of light to output on multiple waveguide channels in the third region. In some examples, the first coupling waveguide is a first rib waveguide in the second region and the second coupling waveguide is a second rib waveguide in the second region. In some examples, the method may include converting the first hybrid mode to a second hybrid mode of the multiple second hybrid modes after the first rib waveguide transitions to a first strip waveguide in the third region and after the second rib waveguide transitions to a second strip waveguide in the third region. In some examples, the first hybrid mode of light has four lobes with a non-zero center equally separating the four lobes and each of the multiple second hybrid modes of light have two lobes and a null at a center between the two lobes. In some examples, the method may include de-coupling one second hybrid mode of light from another second hybrid mode of light, wherein the de-coupling depends at least in part on an increased index of refraction contrast between the first coupling waveguide and the second coupling waveguide in the third region.

In addition to the example aspects and embodiments described above, further aspects and embodiments will become apparent by reference to the drawings and by study of the following description.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another. Additionally, two elements that are "optically coupled" to one another may allow light to pass from one element to the other element.

As used throughout this specification, a reference number without an alpha character following the reference number can refer to one or more of the corresponding references, the group of all references, or some of the references. For example, "205" can refer to any section of the primary waveguide 205 (e.g., section 205A of the primary waveguide 205, section 205B of the primary waveguide 205, etc.), can refer to all sections of the primary waveguide 205, or can refer to some sections of the primary waveguide 205 (e.g., both section 205A and section 205B of the primary waveguide 205 in a first region and a second region) depending on the context in which it is used.

In the following description of examples, reference is made to the accompanying drawings in which it is shown by way of illustration specific examples that can be practiced. It is to be understood that other examples can be used and structural changes can be made without departing from the scope of the various examples.

Generally, optical systems may employ multiple light sources, where the light may be split so that the number of output ports may be greater than the number of input ports. Various systems may be used to split light emitted by light sources, but may include different components and may vary from one another in different ways, such as size, optical efficiency, energy efficiency, wavelength dependence or independence, any combination thereof and so forth. In some examples, light may be split using cascading stages in an optical system and the optical system size may increase with the number of cascading light splitting stages. Because the cascading light splitters scale with the number of output ports, these devices may become unreasonably large and may not be easily incorporated into the optical system. Further, the cascading light splitters may introduce undesirable optical beating into the optical system.

In other examples, a star splitter may be used to split light, using an input waveguide, a free propagation region, and output waveguides. The size of the star splitter may not scale with the number of output ports as another output waveguide may be added without causing too large of an increase in the footprint. However, the free propagation region through which light propagates may cause large optical losses such that up to 35 percent of the input optical power may be lost between the input waveguide and the output waveguides. Even though the star splitter may be size appropriate, the optical power loss may be too great to use in an optical system, thus a compact, low optical loss optical system may be desirable.

Disclosed herein is a light splitting device that includes a primary waveguide, a first coupling waveguide, and a second coupling waveguide. The light splitting device may be a one by four splitter and may be wavelength independent. The primary waveguide may provide light to the light splitting device and the light may couple from the primary waveguide into both the first and second coupling waveguides. Due to the manipulation of the coupling modes, which depends on one or more of the width of the waveguides, the taper of the waveguides, the taper rate of the waveguides, the spacing between the waveguides, the material of the waveguides, any combination thereof, and so forth, a fundamental mode of light may be provided to the light splitting device and four converted fundamental modes of light may be provided as outputs on four output ports or waveguide channels. The terms "output port" and "waveguide channel" may be used interchangeably herein.

In some examples, the primary waveguide may receive a fundamental mode of light as an input. As the light propagates through the primary waveguide, the light may couple equally from the primary waveguide into the first coupling waveguide and the second coupling waveguide. Once the fundamental mode of light in the primary waveguide has no optical power and has been optically coupled into the first and second coupling waveguides, the light may be converted to a first hybrid mode, which may be a four lobe mode. The first and second coupling waveguides may be tapered and separated by a gap such that the first hybrid mode may be converted into two second hybrid modes, which are two lobe modes. Each of the first and second coupling waveguides may have a second hybrid mode of light propagating through them. The first and second coupling waveguides may then be separated by an increasingly large gap to prevent more optical coupling. The first and second coupling waveguides may each have a Y-junction, which converts the second hybrid mode of light back into the fundamental mode of light, to provide four converted fundamental modes of light outputs on four waveguide channels.

These and other embodiments are discussed below with reference to FIGS. 1A-3B. However, those skilled in the art will readily appreciate that the detailed description given herein with respect to these Figures is for explanatory purposes only and should not be construed as limiting.

Figure 1A:
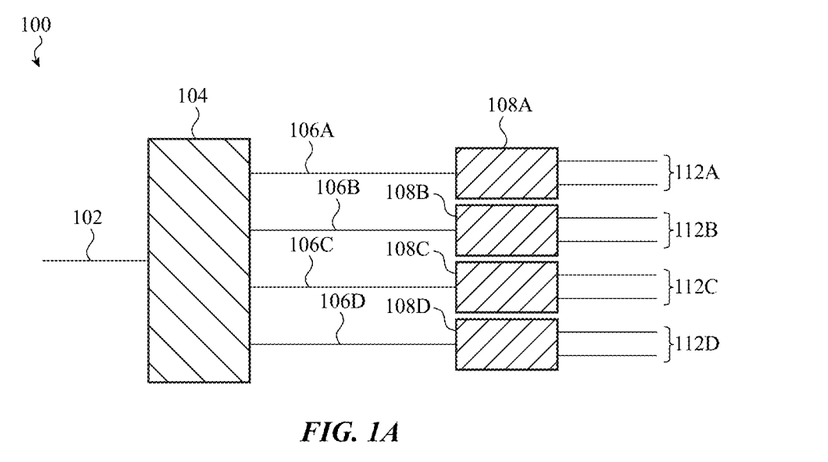
FIG. 1A illustrates a block diagram of a one by eight cascading splitter.

FIG. 1A illustrates a block diagram of a one by eight cascading splitter. The one by eight cascading splitter 100 may include an input light 102, a one by four splitter 104, intermediate light paths 106A-106D, one by two splitters 108A-108D, and light outputs 112A-112D. In FIG. 1A, the one by eight splitter 100 receives a single input of light via the input 102 and has 8 different output ports via the outputs 112A-112D. Generally splitting systems of this type may increase in size with an increase in the number of output ports and, in many applications, it may be desirable to minimize the footprint of the light splitting device.

The input 102 may be an input waveguide that provides input light to the one by four splitter 104. The input light may be provided by a light source, which may be connected to or otherwise integrated into a photonics device. In some examples, the photonics device may include more than one light source, such as lasers, light emitting diodes, semiconductor lasers, coherent light sources, semi-coherent light sources, any combination thereof, and so forth. In some examples, the photonics device is a device with photonics and/or optical functionality and components. As used herein, the photonics device may include the optical splitters.

In the first splitting stage, the one by four splitter 104 may equally split and output light among the four intermediate light paths 106A-106D. In some examples, there may be optical loss associated with each splitting stage. In some examples, the intermediate light paths 106A-106D may be waveguides that may be optically coupled to the one by four splitter 104 to receive the output light from the one by four splitter 104. The intermediate light paths 106A-106D may also be optically coupled to the one by two splitters 108A-108D and may provide light to the one by two splitters 108A-108D. Each of the one by two splitters 108A-108D may provide light outputs 112A-112D. The one by two splitter 108A may provide two light outputs 112A, the one by two splitter 108B may provide two light outputs 112B, and so forth. As shown in FIG. 1A, one by two splitter 108A may split and provide light output 112A, one by two splitter 108B may split and provide light output 112B, and so forth. Similar to the one by four splitter 104, each of the one by two splitters 108A-108D may equally split and output light on the light outputs 112A-D. The second splitting stage with the one by two splitters 108A-108D may also be associated with optical loss.

Also, the one by eight splitter 100 may increase in size with each additional splitting stage. For example, instead of a one by four splitter 104 being used, the input 102 may be provided to a one by two splitter, and then for each of those two outputs, another set of one by two splitters may be used to achieve the four intermediate outputs. Because an additional splitting stage is added in this described example, this example system may be larger than the system illustrated in FIG. 1A. Because optical systems are being incorporated into smaller and smaller form factor devices, cascading splitters may be too large in size to be reasonably incorporated into the smaller form factor devices such as a mobile device.

Figure 1B:
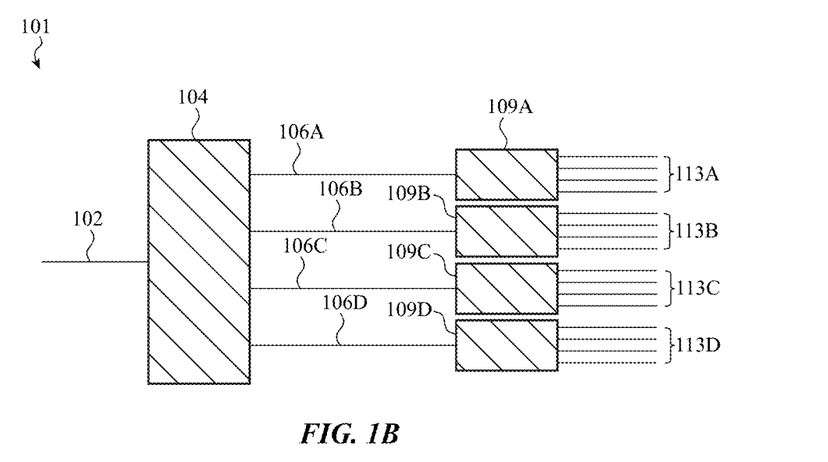
FIG. 1B illustrates a block diagram of a one by sixteen cascading splitter.

FIG. 1B illustrates a block diagram of a one by sixteen cascading splitter. Similar to the cascading splitter of FIG. 1A, the one by sixteen cascading splitter 101 may increase in size with an increase in the number of output ports even though it may be desirable to minimize the footprint of the light splitting device. The one by sixteen cascading splitter 101 includes a light input 102, a one by four splitter 104, intermediate light paths 106A-106D, one by four splitters 109A-109D, and light outputs 113A-113D. The one by sixteen cascading splitter 101 provides another example of a cascading splitter in which optical loss may occur and that increases in size with each cascading stage. The one by sixteen cascading splitter 101 may employ all one by four splitters to achieve the 16 port output device. As the number of cascading stages increases, the optical beating may become an issue, thus making a device with the capability of splitting light while maintaining a reasonable size and reducing optical beating desirable.

Figure 1C:
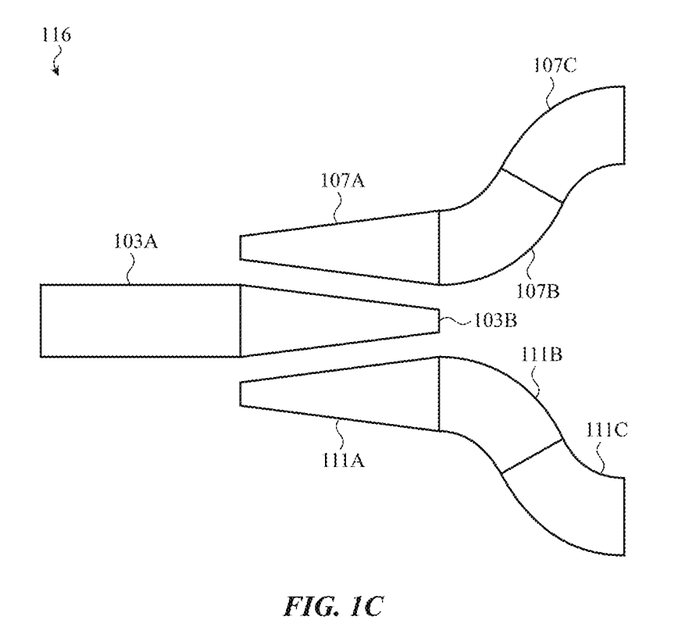
FIG. 1C illustrates an example y-splitter.

FIG. 1C illustrates an example y-splitter. The y-splitter 116 includes an input waveguide 103, a first coupling waveguide 107 and a second coupling waveguide 111. The y-splitter 116 of FIG. 1C is adiabatic and wavelength independent. Additionally, the y-splitter 116 is one example of a one by two splitter and may gradually transfer the optical power from the input waveguide 103 to the first coupling waveguide 107 and the second coupling waveguide 111 insofar as the light may couple between the input waveguide 103 and the first and second coupling waveguides 107, 111. The y-splitter 116 has three regions that include a first region for inputting the light, a second region for coupling the light from the input waveguide 103 to the first coupling waveguide 107 and the second coupling waveguide 111, and a third region for outputting the light from the first coupling waveguide 107 and the second coupling waveguide 111.

The first region of the y-splitter 116 includes section 103A of input waveguide 103, a second region that includes section 103B of the input waveguide 103 and section 107A of the first coupling waveguide 107 and section 111A of the second coupling waveguide 111, and a third region that includes sections 107B, 107C of the first coupling waveguide 107, and sections 111B, 111C of the second coupling waveguide 111. In the first section of y-splitter 116, section 103A of the input waveguide 103 may provide light to the y-splitter 116.

In the second region of y-splitter 116, the light continues to propagate in section 103B of the input waveguide 103 and may optically couple from the input waveguide 103B to both section 107A of the first coupling waveguide 107 and section 111A of the second coupling waveguide 111. In some examples, the light may couple gradually over the length of section 103B of the input waveguide 103. At the end of section 103B of the input waveguide 103, most to all of the light may be coupled into the first and second coupling waveguides 107, 111.

In the third region of the y-splitter 116, the light may continue to propagate through each of the coupling waveguides 107, 111 respectively. As shown in FIG. 1C, section 107B of the first coupling waveguide 107 and section 111B of the second coupling waveguide 111 may be separated by an increasingly large distance so that light may not couple between the two coupling waveguides in the third section. As shown in FIG. 1C, light may be output at section 107C of the first coupling waveguide 107 and light may be output at section 111C of the second coupling waveguide 111.

Figure 2A:
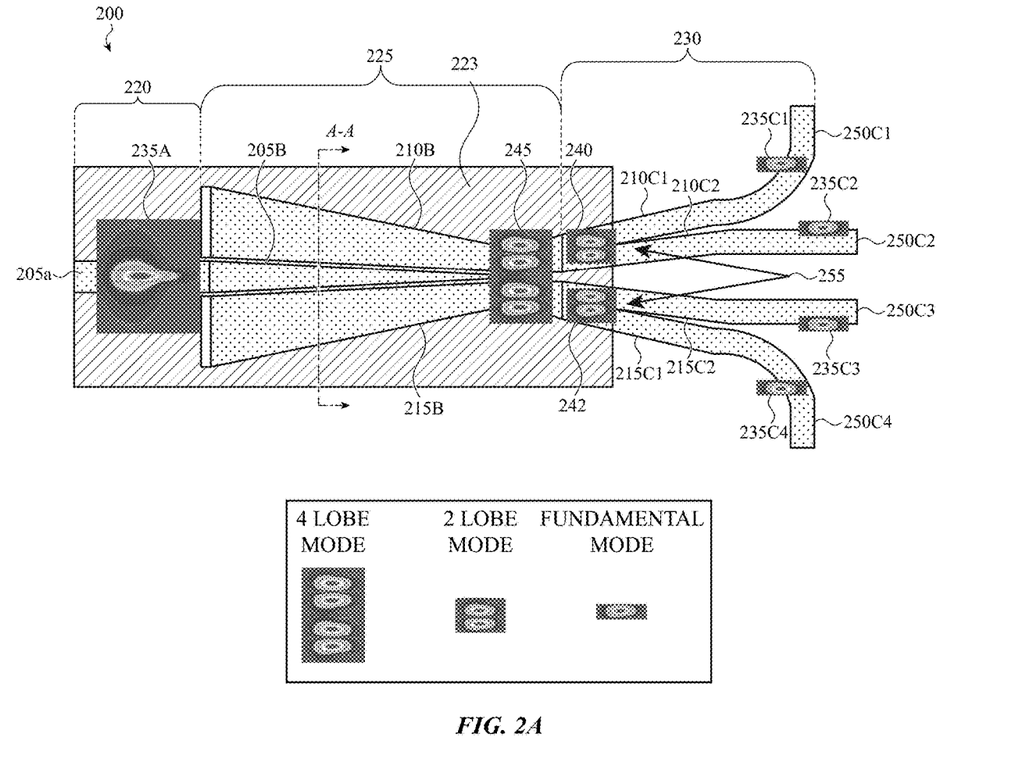
FIG. 2A illustrates an example of a one by four splitter.

FIG. 2A is an illustration of an example one by four splitter. The one by four splitter may be provided with a single input of light with a fundamental mode and may output light as four converted fundamental modes on four waveguide channels. The fundamental mode of light may have one lobe as shown in FIG. 2A. The one by four splitter 200 of FIG. 2 includes a primary waveguide 205, a first coupling waveguide 210, a second coupling waveguide 215, and a substrate 223. The one by four splitter 200 may increase the number of output ports to four waveguide channels, while maintaining a similar size as a one by two splitter. Additionally, the one by four splitter 200 may be wavelength independent. In some examples, some portions of the first coupling waveguide 210 and/or the second coupling waveguide 215 may be lengthened to slow the wavelength dependence. It may be understood that all of the waveguides may be surrounded by a low-index cladding region to confine light to the waveguides. Generally, the waveguides described herein may include a core or propagation region, with cladding layers on both sides of the propagation region.

In some examples, the one by four splitter 200 may be a low optical loss device and the optical loss experienced may be primarily due to insertion loss and/or a power imbalance between the arms or branches of the one by four splitter 200. The one by four splitter 200 may also be smaller than cascading splitters as described with reference to FIGS. 1 and 1B, but may suffer less from less optical loss than a one by four star splitter device, which may lose approximately 35 percent of its optical power primarily contributed by the coupling between the free propagation region and the output waveguides. Although a one by four star splitter device and the one by four splitter 200 may both be smaller in size than the cascading splitters of FIGS. 1 and 1B, the one by four splitter 200 experiences significantly less optical loss than the one by four star splitter device as the insertion loss is reduced in the one by four splitter 200.

The one by four splitter 200 has a first region 220 that is an input region, a second region 225 that is an interactive region (e.g., a coupling region), and a third region 230 that is an output region (e.g., a fanning region). The first region 220 may include section 205A of the primary waveguide 205. The first region 220 may be the input region insofar as the primary waveguide 205 may input light to the one by four splitter 200. The light supplied by the primary waveguide 205 may be a single wavelength of light or may be wavelength ranges of light. Although it is possible for a single wavelength of light to be supplied to the one by four splitter 200, different wavelengths of light may pass through the one by four splitter 200 at different times.

As shown in FIG. 2A, the light provided to the one by four splitter 200 is a fundamental mode 235 (e.g., a single mode) of light. The fundamental mode 235 of light may propagate through section 205A of the primary waveguide 205 into the second region 225 of the one by four splitter 200. In some examples, the fundamental mode 235 of light may be multimode light before it reaches the section 205A of the primary waveguide 205. The primary waveguide 205 may be designed with a certain width and/or taper to generate the fundamental mode of light by confining the multimode light in the primary waveguide 205.

In the second region 225, the first coupling waveguide 210 and the second coupling waveguide 215 may start in the second region 225 and the primary waveguide 205 may terminate near or by the end of the second region 225. The phrase "terminate near the end of the second region 225" indicates that the primary waveguide 205 may terminate closer to the end of the second region 225 than the middle of the second region 225. As shown in FIG. 2A, the primary waveguide has a first side adjacent to section 210B of the first coupling waveguide 210 and a second side adjacent to section 215B of the second coupling waveguide 215. Additionally, the light in primary waveguide 205 may be close to or completely coupled from the primary waveguide 205 to the first coupling waveguide 210 and the second coupling waveguide 215 close to or by the end of the second region 225. It may be understood that less than five percent of the light may be in the primary waveguide 205 by the end of the second region 225 of the one by four splitter 200.

In the second region 225 of the one by four splitter 200, section 205B of the primary waveguide 205 may be optically coupled to both section 210B of the first coupling waveguide 210 and section 215B of the second coupling waveguide 215. As shown in FIG. 2A, the width of the primary waveguide 205 may be tapered and decrease in width as the light propagates through the primary waveguide 205. Section 210B of the first coupling waveguide 210 may also be tapered and decrease in width in the second region 225. Similarly, section 215B of the second coupling waveguide 215 may be tapered and decrease in width. In some examples, the first and second coupling waveguides 210, 215 may be wider than the primary waveguide 205 at any given point along a length of the primary waveguide. Additionally, the optical coupling from the primary waveguide to the first and second coupling waveguides may depend one or more of the taper rates of the primary waveguide, the first coupling waveguide and/or the second coupling waveguide.

Additionally in the second region 225 of the one by four splitter 200, the primary waveguide 205 may be adjacent to the first coupling waveguide 210 and adjacent to the second coupling waveguide 215. In some examples, the gap between the primary waveguide 205 and the first and second coupling waveguides 210, 215 may be as small as fabrication may allow and may be consistent through the second region 225. In some examples, the gap may vary in width. Additionally, although the primary waveguide 205, the first coupling waveguide 210, and the second coupling waveguide 215 are depicted with straight sides, in some examples, the waveguides may be curved so long as the appropriate width of the waveguides is maintained and the gap between the waveguides is appropriately maintained to allow optical coupling between the waveguides. It may be understood that in the second region 225, the gap may be filled with a material that allows coupling between the primary waveguide 205 and the first coupling waveguide 210 as well as coupling between the primary waveguide 205 and the second coupling waveguide 215. In some examples, the gap may be air.

The fundamental mode 235A of light may continue to propagate from the first region 220 to the second region 225 through sections 205A and 205B of the primary waveguide 205. Although the primary waveguide 205 may be described using the term "sections," it may be understood that the primary waveguide 205 is one continuous waveguide insofar as the light may propagate uninterrupted between the sections of the waveguide and the term "sections" is used for explanatory purposes only. Similarly, the first coupling waveguide 210 is one continuous waveguide and the second coupling waveguide 215 is one continuous waveguide even though both of these waveguides will also be described as having sections.

The second region 225 of the one by four splitter 200 may be an interactive region as the fundamental mode of light may couple, over the length of the second region 225, from the primary waveguide 205 into the first coupling waveguide 210 and the second coupling waveguide 215. As shown in FIG. 2A, section 205B of the primary waveguide 205 may supply light with a fundamental mode 235A, but as section 205B narrows and due to the proximity of the first coupling waveguide 210 and the second coupling waveguide 215 to the primary waveguide 205, the light may couple approximately equally into each of the first coupling waveguide 210 and the second coupling waveguide 215. The fundamental mode 235A of light with one lobe may be converted into a first hybrid mode 245 of light near the end or by the end or at the end of the second region 225. That is, the fundamental mode 235A of light may be converted into the first hybrid mode near the end of the second region 225, where the termination point is closer to the end of the second region 225 than the middle of the second region 225. The first hybrid mode 245 of light may be a four lobe mode as depicted in FIG. 2A. The four lobe mode may reduce optical loss by efficiently coupling into the second hybrid mode 240 in the third region 230. The terms "first hybrid mode" and "four lobe mode" may be used interchangeably herein.

In some examples, the conversion of the fundamental mode of light 235A to the first hybrid mode 245 of light may depend at least in part on the width and taper of the waveguides, as well as the material of the waveguides. Due to the width and taper, the first hybrid mode 245 may be efficiently excited from the fundamental mode of light. As shown in FIG. 2A, the four lobe mode may be symmetric and may include a non-zero portion between the top two lobes and the bottom two lobes. The non-zero portion of the four lobe mode may be indicative of light between the top two lobes and the bottom two lobes. Even though the first hybrid mode 245 may be a higher order mode, the light may still undergo low optical loss when coupling from the primary waveguide 205 to the first and second coupling waveguides 210, 215. By employing the first hybrid mode 245, loss may be avoided once the light encounters the Y-junction in the third region 230. Additionally, it may be understood that the first hybrid mode 245 of light may span section 210B of the first coupling waveguide 210 and section 215B of the second coupling waveguide 215 near the end or at the end of the interactive region or the second region 225. The first hybrid mode 245 will be described in further detail with reference to FIG. 2C.

The third region 230 of the one by four splitter 200 may include the first coupling waveguide 210 and the second coupling waveguide 215 as well as Y-junctions 255 in each. The third region may be a fanning region insofar as the first and second coupling waveguides may "fan out" or separate into four light outputs. As shown in FIG. 2A, the first coupling waveguide 210 may form a Y-junction 255 with a first branch 210C1 and a second branch 210C2. Similarly, the second coupling waveguide 215 also has a Y-junction 255 with a third branch 215C1 and a fourth branch 215C2. Additionally, the first hybrid mode 245 may be converted to second hybrid modes 240 and 242, where the second hybrid modes 240, 242 may be two lobe modes. Additionally, the second hybrid modes 240 and 242 may be independent. The terms "second hybrid mode" and "two lobe mode" may be used interchangeably herein.

In FIG. 2A, first coupling waveguide 210 may have a second hybrid mode 240 of light and the second coupling waveguide 215 may have a second hybrid mode 242 of light at the beginning of the third region 230. The second hybrid mode 240 of light may be a stable mode as the light converts from the first hybrid mode 245 to the second hybrid mode 240. In some examples, in the third region 230 the first coupling waveguide 210 and the second coupling waveguide 215 may "fan out" or be separated from one another by an increasingly large distance. Because the first and second coupling waveguides become farther apart from one another, the light may not couple between the two waveguides in the third region 230.

As shown in FIG. 2A, part of the way through the third region 230, the first and second coupling waveguides 210, 215 may each form a Y-junction 255. In some examples of the Y-junction, the first and second branches 210C1 and 210C2 of the first coupling waveguide 210 may begin to "fan out" to create a larger gap or may separate from one other by an increasingly large distance. The third and fourth branches 215C1 and 215C2 of the second coupling waveguide 215 may be similarly configured. As the gap between of the respective branches 250C1 and 250C2, and 250C3 and 250C4 begins to increase, the second hybrid modes 240, 242 may separate and convert back into four converted fundamental modes 235C1-235C4. The "converted fundamental modes" have been converted from second hybrid modes to fundamental modes in the third region 230. In some examples, the gap between the first coupling waveguide 210 and the second coupling waveguide 215 may be a low-index cladding region. It may be understood that in the third region 230, the gap between the first coupling waveguide 210 and the second coupling waveguide 215 may be a region between the first and second coupling waveguides that may increase to separate the first and second coupling waveguides. The gap in the third region may differ from the gap in the second region in that the gap in the second region is a consistent distance and the gap in the third region increases. Further, the gap in the second region may be filled with a material that allows optical coupling, whereas the gap in the third region may be filled with a material that inhibits optical coupling.

Additionally, the gap in the third region may include any material that may prevent further coupling of light between the first and second coupling waveguides. In some examples, the gap in the third region may be air. Although the terms "fundamental mode" and "converted fundamental mode" are used herein, both terms refer to a fundamental mode with the difference being the converted fundamental mode is converted from a second hybrid mode to a fundamental mode.

Figure 2B:
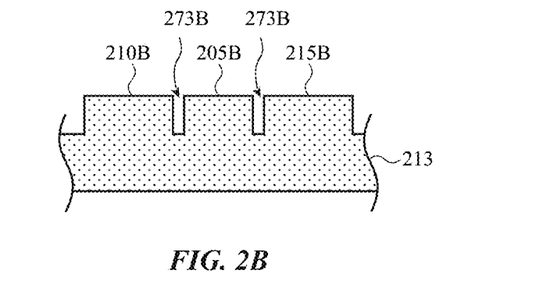
FIG. 2B illustrates an expanded cross section of the one by four splitter.

FIG. 2B illustrates an expanded cross section of the one by four splitter. As shown in cross-section view 250 of the one by four splitter 200 along lines A-A' of FIG. 2A, substrate 223, section 205B of the primary waveguide 205, section 210B of the first coupling waveguide 210, and section 215B of the second coupling waveguide 215 may be approximately the same height, but different widths. The cross-section view 250 also includes the gaps 273B between section 205B of the primary waveguide 205, section 210B of the first coupling waveguide 210, and section 215B of the second coupling waveguide 215. In some examples, the waveguides may include layers, such as a top cladding layer, a propagation region, and a bottom cladding layer which will be described in further detail with reference to FIG. 3A. As shown in FIG. 2B, section 205B of the primary waveguide has a first side adjacent to section 210B of the first wav The cross-section expanded view 250 also illustrates shoulder 213, which may be the area located between the waveguides. Because the cross-section expanded view 250 is located in the second region of the one by four splitter, the primary waveguide 205 and first and second coupling waveguides 210 and 215 are rib waveguides. Thus, the shoulder 213 may be the same material as the primary waveguide 205 and first and second waveguides 210, 215. While the gap 273B is illustrated as an empty space in FIG. 2B, the gaps 273B may be filled with a material that allows coupling such as a dielectric. In other examples, the gaps 273B may be air. The shoulder 213 and the gaps 273B may separate the waveguides from one another. The cross-section expanded view 250 illustrates a rib waveguide, which may be formed from a single material, such as silicon.

In some examples, the one by four splitter 200 (shown in FIG. 2A) may be a rib to strip waveguide as will be described with reference to FIG. 3A, where the stack of a strip waveguide may be etched deeper than that of a rib waveguide. In some examples of a rib waveguide, the stack may be partially etched through to form the gaps 273B, so that the shoulder 213 may still separate the waveguides as shown in the cross-section view 250. The expanded section of FIG. 2A is for illustrative and explanatory purposes and is not to scale.

Figure 2C:
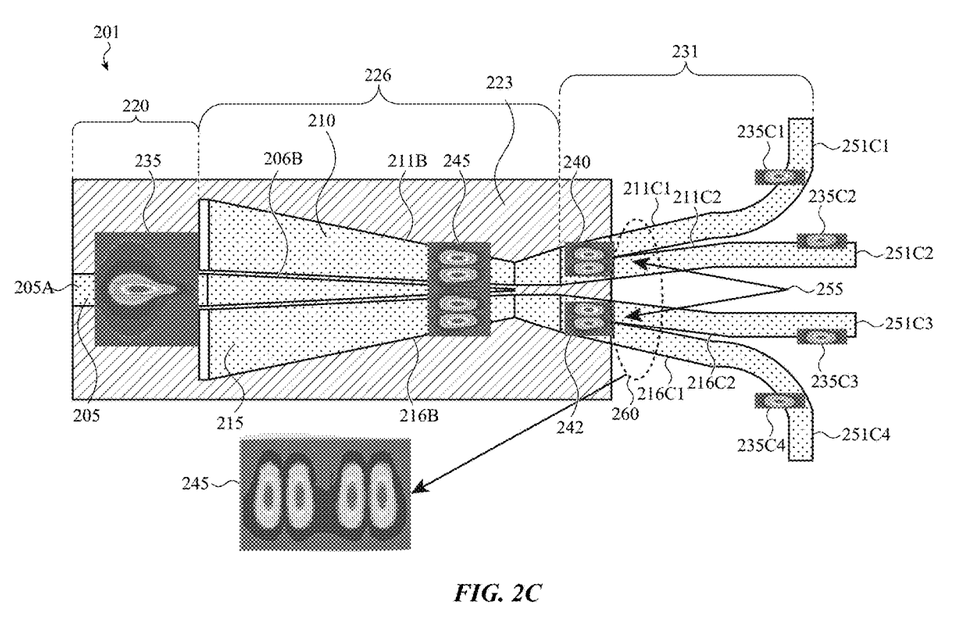
FIG. 2C illustrates an example of another one by four splitter.

FIG. 2C illustrates an example of another one by four splitter. The one by four splitter 201 includes a primary waveguide 206, a first coupling waveguide 211, and a second coupling waveguide 216. Similar to the one by four splitter 200 of FIG. 2A, in FIG. 2C, the input light may have a fundamental mode 235 of light provided by the primary waveguide 211 in the first region 220. Generally, the functionality of the one by four splitter 201 of FIG. 2C may be the same as the functionality of the one by four splitter 200 of FIG. 2A.

In the second region 226 of FIG. 2C, the first coupling waveguide 211B may taper consistently down to a small width until after the termination of the primary waveguide 206B. After the primary waveguide 206B terminates in the second region 226, the first coupling waveguide 211B may increase in width to the start of the third region 231. The second coupling waveguide 216B may mirror the first coupling waveguide 211B in that after the primary waveguide 206B terminates; the width of the second coupling waveguide 216B may also increase. The width increase of the consistent gap between the first and second coupling waveguides 211B and 216B just after the primary waveguide 206B terminates, may be designed to convert the first hybrid mode 245 into the two separate second hybrid modes 240 and 242 near the start of the third region 231. The waveguides and gaps between them are not drawn to scale and are depicted in the figure for explanatory purposes only. In some examples, the first and second coupling waveguides may be wider than the primary waveguide.

Near the end or at the end of the second region 226, the fundamental mode of light may no longer have any optical power as the optical power has been transferred to the first hybrid mode 245. As shown in the expanded four lobe mode in region 260, the lobes may be symmetric and may include a non-zero portion between the first two lobes and the second two lobes. The non-zero portion of the four lobe mode may be indicative of light between the first two lobes and the second two lobes. The four lobe mode may be a suitable higher order mode that may propagate across the gap between the first and second coupling waveguides 211 and 216, and then be converted to the second hybrid mode 240 in the third region 231.

In some examples, excitation of other modes may occur in addition to or instead of the first hybrid mode 245 or the four lobe mode due to unexpected reflections and/or coupling. In some examples, the second hybrid mode 240 of light may occur due to these unexpected reflections and/or coupling. Over a broad wavelength range, the first hybrid mode 245 of light might lose relatively more light around certain wavelengths and the second hybrid mode 240 of light may increase around the same wavelengths. In this example, the loss may be mitigated even with an undesirable and accidental mode coupling. In some example embodiments, a "broad wavelength range" may be generally a set of emitted wavelengths over the approximate range of 1 µm.

Additionally, the second hybrid mode 240 may continue to propagate through the first coupling waveguide 211 and the second coupling waveguide 216 into the respective Y-junctions, where the coupling may not be ideal, but will still separate into two fundamental modes 235. Further the accidental excitation of the second hybrid mode 240 of light may create a power imbalance between the branches but may not affect the insertion loss.

Near or at the beginning of the third region 231, a gap between the first coupling waveguide 211 and the second coupling waveguide 216 may increase to prevent coupling between the two waveguides. As shown in FIG. 2C, the second hybrid mode 240 of light may have 2 lobes and is null at the center. The second hybrid mode 240 of light may propagate in the first coupling waveguide 206 and the second coupling waveguide 211 in the third region 231 with little to zero optical power loss and little to zero reflections until the second hybrid mode 240 of light encounters the respective Y-junctions of the first and second coupling waveguides 206 and 211. Similar to the one by four splitter 200 of FIG. 2A, in FIG. 2C, the light may convert from the second hybrid mode 240 to four converted fundamental modes 235C1-235C4 in branches 211C1, 211C2, 216C1, and 216C2, and the light may be output at the ports 251C1, 251C2, 251C3, and 251C4. The "converted fundamental modes" are fundamental modes that have been converted from the second hybrid mode 240 to fundamental modes in the third region 231.

Figure 3A:
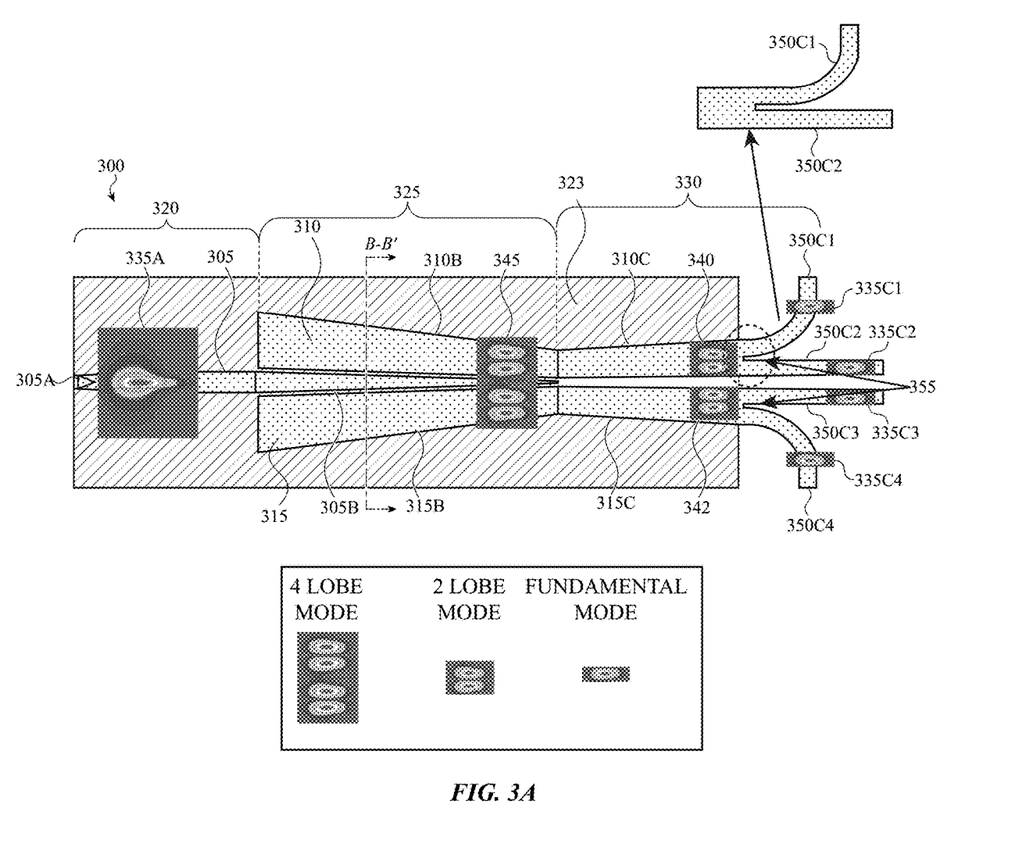
FIG. 3A illustrates an example of another one by four splitter.

FIG. 3A illustrates an example of another one by four splitter. The one by four splitter 300 may be a rib to strip splitter. The one by four splitter 300 may be provided with a single input of light with a fundamental mode and may output light with a fundamental mode on four waveguide channels or ports. The one by four splitter 300 of FIG. 3A includes a primary waveguide 305, a first coupling waveguide 310, and a second coupling waveguide 315. In FIG. 3A, the one by four splitter 300 may also include a silicon slab 323 under the waveguides because the one by four splitter 300 is a rib to strip splitter, which will be discussed in further detail herein. It may be understood that all of the waveguides may be surrounded by a low-index cladding region to confine light to the waveguides.

The one by four splitter 300 has a first region 320 that is an input region, a second region 325 that is an interactive region (e.g., a coupling region), and a third region 330 that is an output region (e.g., a fanning region). The first region 320 may include section 305A of the primary waveguide 205. The first region 220 may be the input region insofar as the primary waveguide 205 may input light to the one by four splitter 200.

As shown in FIG. 3A, the light provided to the one by four splitter 300 is a fundamental mode 335 (e.g., a single mode) of light. The fundamental mode 335 of light may propagate through section 305A of the primary waveguide 305 into the second region 325 of the one by four splitter 300. In some examples, the fundamental mode 335 of light may be multimode light before it reaches the section 305A of the primary waveguide 305. As previously described, the primary waveguide 305 may be designed with a certain width and/or taper to generate the fundamental mode of light by confining the multimode light in the primary waveguide 305. Additionally, the optical coupling from the primary waveguide to the first and second coupling waveguides may depend on one or more of the taper rates of the primary waveguide, the first coupling waveguide and/or the second coupling waveguide. For example, if all of the primary waveguides had lower taper rates (e.g., started wider and arrived at the same width as shown in FIG. 3A over a longer length), the optical coupling may be slower.

The second region 325 may be similar to the one by four splitter 200 of FIG. 2A and section 305B of the primary waveguide 305 may be optically coupled to both section 310B of the first coupling waveguide 310 and section 315B of the second coupling waveguide 315. In the second region 325, the primary waveguide 305, the first coupling waveguide 310, and the second coupling waveguide 315 may be similarly adjacent and separated from one another by a consistent gap as in FIG. 2A and also may be similarly tapered to allow coupling of the fundamental mode 335 to convert to the first hybrid mode 345.

The third region 330 of the one by four splitter 300 may include the first coupling waveguide 310 and the second coupling waveguide 315 as well as Y-junctions 355 in each. The third region 330 may differ from the third regions 230 of FIGS. 2A and 2C in that the first coupling waveguide 310C and the second coupling waveguide 315C may be separated by an increasing gap, as well as the silicon slab 323, which is accentuated in black for visibility purposes in FIG. 3A. Additionally, in the third region 330, the rib waveguide may convert or transition to the strip waveguide, which may allow for the conversion of the first hybrid mode 345 into the second hybrid modes 340, 342. It may be understood that the rib to strip waveguide conversion or transition may be complete near or at the conversion of the hybrid modes. Additionally, the rib to strip waveguide conversion or transition may be complete before the first coupling waveguide 310 and the second coupling waveguide 315 form Y-junctions 355.

When the first coupling waveguide 310C and the second coupling waveguide 315C are isolated without the silicon slab 323 to connect the two waveguides, the optical coupling between the waveguides significantly drops so that the modes may separate from the four lobe mode to the two lobe mode. It may be understood that, in the gap between the first coupling waveguide 310C and the second coupling waveguide 315C, the area where no silicon slab 323 is depicted may be filled with low-index cladding. Additionally, the third region 330 where the first coupling waveguide 310 and the second coupling waveguide 315 transition from a rib waveguide to a strip waveguide, the length may be shortened when compared to the third region 230 of FIG. 2A, which does not have a rib to strip transition.

Similar to FIG. 2A, in the third region 330 the first coupling waveguide 310C and the second coupling waveguide 315C may "fan out" or be separated from one another by an increasingly large gap. Because the first and second coupling waveguides become farther apart from one another, the light may not couple between the two waveguides in the third region 330. In the expanded section of the third region 330 of FIG. 3A, the Y-junction 355 of the first coupling waveguide 310 may "fan out" to create a larger gap or may separate the branches from one another by an increasingly large distance. As shown, the first branch 350C1 may be a curved section and the second branch 350C2 may be straight. It may be understood that all, some, or none of the branches 350C1, 350C2, 350C3, and 350C4 may be curved. The third and fourth branches 350C3 and 350C4 of the second coupling waveguide 315 may be similarly configured. As the gap between the respective branches 350C1 and 350C2, and 350C3 and 350C4 begins to increase, the second hybrid modes 340, 342 may convert back into four converted fundamental modes 335C1-335C4. The "converted fundamental modes" have been converted from second hybrid modes to fundamental modes in the third region 330.

Figure 3B:
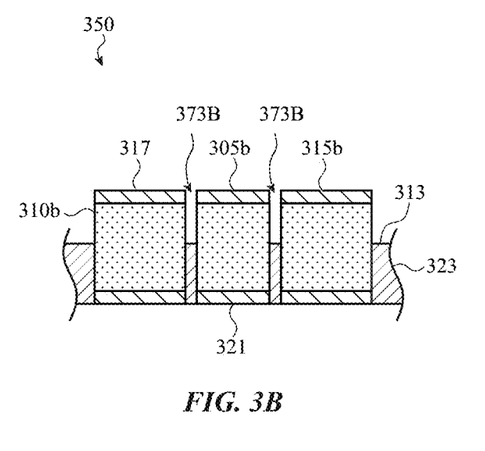
FIG. 3B illustrates an expanded cross section of the one by four splitter.

FIG. 3B illustrates an expanded cross section of the one by four splitter. In the cross-section expanded view 350 of the one by four splitter 300 along line B-B', section 305B of the primary waveguide 305, section 310B of the first coupling waveguide 310, and section 315B of the second coupling waveguide 315 may be approximately the same height, but different widths. As shown in the cross-section view 350, the waveguides may include layers, such as top cladding layer 317, propagation region 319, and bottom cladding layer 321. The cross-section expanded view 350 also illustrates the silicon slab 323 and gaps 373b between the primary waveguide 305 and first and second coupling waveguides 310, 315. Similar to FIG. 2B, gaps 373B in the second region may be filled with a material that allows optical coupling between the primary waveguide 305 and first and second coupling waveguides 310, 315. In some examples, gaps 373B may be air.

The cross-section expanded view 350 also includes shoulder 313, which may be the area located between the waveguides. The shoulder 313 may separate the waveguides from one another. The cross-section expanded view 350 illustrates a rib waveguide. In some examples of a strip waveguide, the stack may be partially etched, so that the shoulder 313, which may be silicon slab 323 (e.g., the shoulder 313 and the waveguides 315b, 305b and 315b are different materials) may separate the waveguides as shown in the cross-section view 350. The expanded section of FIG. 3B is for illustrative and explanatory purposes and is not to scale. The strip waveguide may be etched further down than the rib waveguide so that a thin layer may separate the waveguides from one another and there may not be a significant shoulder as the shoulder 313 depicted in FIG. 3B.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:
1. A light splitting device, comprising:
    a first region configured to provide a fundamental mode of light;
    a second region configured to convert the fundamental mode of light to a first hybrid mode of light, the second region comprising:
        a primary waveguide with a first side and a second side;
        a first coupling waveguide adjacent to the first side of the primary waveguide; and
        a second coupling waveguide adjacent to the second side of the primary waveguide; and
    a third region configured to convert the first hybrid mode of light to multiple second hybrid modes of light, the third region comprising:
        a first Y-junction in the first coupling waveguide and configured to convert one of the multiple second hybrid modes of light to the fundamental mode of light; and
        a second Y-junction in the second coupling waveguide and configured to convert another of the multiple second hybrid modes of light to the fundamental mode of light.
2. The light splitting device of claim 1, wherein:
    the first hybrid mode of light is a four lobe mode of light;
    the multiple second hybrid modes of light are each two lobe modes of light;
    the primary waveguide terminates near an area that the fundamental mode of light is converted to the first hybrid mode of light.
3. The light splitting device of claim 1, wherein:
    the fundamental mode of light is inputted on the primary waveguide; and
    the first Y-junction and the second Y-junction are configured to output four converted fundamental modes.
4. The light splitting device of claim 1, wherein the first and second coupling waveguides are wider than the primary waveguide.
5. The light splitting device of claim 1, wherein:
    the first and second coupling waveguides in the second region are tapered waveguides; and
    optical coupling from the primary waveguide to the first and second coupling waveguides depends on at least a taper rate of the first and second coupling waveguides.
6. The light splitting device of claim 1, wherein the first and second coupling waveguides in the second region decrease in width.
7. The light splitting device of claim 1, wherein the first and second coupling waveguides in the third region are separated by a gap that increases in width.
8. The light splitting device of claim 1, wherein, in the second region, a width of a first gap between the primary waveguide and the first coupling waveguide and a width of a second gap between the primary waveguide and the second coupling waveguide is the same.
9. The light splitting device of claim 1, wherein:
    one of the multiple second hybrid modes of light is a first two lobe mode that propagates in the first coupling waveguide of the third region to the first Y-junction; and another of the multiple second hybrid modes of light is a second two lobe mode that propagates in the second coupling waveguide of the third region to the second Y-junction.

10. A light splitting device, comprising:
an input region configured to provide light having a fundamental mode;
an interactive region configured to convert the fundamental mode into a first hybrid mode; and
a fanning region configured to:
 convert the first hybrid mode into multiple second hybrid modes; and
 convert the multiple second hybrid modes into multiple converted fundamental modes.

11. The light splitting device of claim 10, wherein:
the first hybrid mode has four lobes;
the multiple second hybrid modes each have two lobes;
the light splitting device further comprises:
 a silicon slab;
 a primary waveguide disposed on the silicon slab;
 a first coupling waveguide disposed on the silicon slab;
 a second coupling waveguide disposed on the silicon slab;
the first and second coupling waveguides are rib waveguides in the interactive region; and
the first and second coupling waveguides convert to strip waveguides in the fanning region.

12. The light splitting device of claim 10, wherein:
the fanning region comprises:
 a first coupling waveguide with a first Y-junction;
 a second coupling waveguide with a second Y-junction; and
 the first hybrid mode has four lobes to reduce optical loss near at least one or both of the first or second Y-junction.

13. The light splitting device of claim 10, further comprising:
a silicon slab;
a first rib waveguide disposed on the silicon slab in the fanning region;
a second rib waveguide disposed on the silicon slab in the fanning region, wherein:
 the first rib waveguide and the second rib waveguide are separated from one another by a gap that increases in width along the fanning region; and
 the gap comprises a low-index cladding region.

14. The light splitting device of claim 10, wherein:
the light splitting device further comprises:
 a first rib waveguide that transitions to a first strip waveguide in the fanning region;
 a second rib waveguide that transitions to a second strip waveguide in the fanning region, thereby decoupling the first and second strip waveguides from one another.

15. The light splitting device of claim 10, wherein the fanning region converts the multiple second hybrid modes into the fundamental mode, thereby outputting four fundamental modes with equal optical power.

16. The light splitting device of claim 10, wherein:
the light splitting device further comprises:
 a first rib waveguide that transitions to a first strip waveguide in the fanning region;
 a second rib waveguide that transitions to a second strip waveguide in the fanning region; and
 the first rib waveguide completes transitioning to the first strip waveguide and the second rib waveguide completes transitioning to the second strip waveguide before the first hybrid mode converts to a second hybrid mode.

17. A method for splitting light, comprising:
inputting light having a fundamental mode of light using a primary waveguide in a first region;
converting the fundamental mode of light into a first hybrid mode of light in a second region by coupling the fundamental mode of light from the primary waveguide to a first coupling waveguide and a second coupling waveguide;
converting the first hybrid mode of light into multiple second hybrid modes of light in a third region, wherein the first coupling waveguide and the second coupling waveguide are separated by a gap; and
converting the multiple second hybrid modes of light back into multiple fundamental modes of light to output on multiple waveguide channels in the third region.

18. The method of claim 17, wherein:
the first coupling waveguide is a first rib waveguide in the second region;
the second coupling waveguide is a second rib waveguide in the second region; and
the method further comprising:
 converting the first hybrid mode to a second hybrid mode of the multiple second hybrid modes after the first rib waveguide transitions to a first strip waveguide in the third region and after the second rib waveguide transitions to a second strip waveguide in the third region.

19. The method of claim 17, wherein:
the first hybrid mode of light has four lobes with a non-zero center equally separating the four lobes; and
each of the multiple second hybrid modes of light have two lobes and a null at a center between the two lobes.

20. The method of claim 17, further comprising:
de-coupling one second hybrid mode of light from another second hybrid mode of light, wherein the de-coupling depends at least in part on an increased index of refraction contrast between the first coupling waveguide and the second coupling waveguide in the third region.

* * * * *